(12) United States Patent
Kim

(10) Patent No.: US 12,201,088 B2
(45) Date of Patent: Jan. 21, 2025

(54) CONNECTOR FOR PET LEAD ROPE

(71) Applicant: Deok-Han Kim, Pyeongtaek-si (KR)

(72) Inventor: Deok-Han Kim, Pyeongtaek-si (KR)

( * ) Notice: Subject to any disclaimer, the term of this patent is extended or adjusted under 35 U.S.C. 154(b) by 0 days.

(21) Appl. No.: 18/226,266

(22) Filed: Jul. 26, 2023

(65) Prior Publication Data

US 2024/0065231 A1    Feb. 29, 2024

(30) Foreign Application Priority Data

Aug. 23, 2022 (KR) .................. 10-2022-0105164

(51) Int. Cl.
*A01K 27/00* (2006.01)
(52) U.S. Cl.
CPC .................... *A01K 27/005* (2013.01)
(58) Field of Classification Search
CPC ............ A01K 27/005; B65D 2525/285; B65D 2525/2879; A47J 45/062; A47J 45/065; A47J 45/072; A47J 45/075; A47J 45/07; A47J 45/10
USPC .... 16/406, 114.1, 110.1, 422, 425, 426, 430
See application file for complete search history.

(56) References Cited

U.S. PATENT DOCUMENTS

| | | | | |
|---|---|---|---|---|
| 7,726,261 B2* | 6/2010 | Everhart | ............... | A01K 27/005 119/771 |
| 2006/0065210 A1* | 3/2006 | Tozawa | ................ | A01K 27/005 119/863 |

FOREIGN PATENT DOCUMENTS

| | | |
|---|---|---|
| CN | 206851711 U | 1/2018 |
| JP | 3118268 U | 1/2006 |
| KR | 20-2000-0005520 U | 3/2000 |

OTHER PUBLICATIONS

Office Action of Korean Patent Application No. 10-2022-0105164 mailed Nov. 3, 2022.

* cited by examiner

*Primary Examiner* — Robert Sandy
(74) *Attorney, Agent, or Firm* — Revolution IP, PLLC

(57) ABSTRACT

According to an embodiment, a connector for connecting a lead rope to a harness worn on a body of a pet includes: a pair of rectangular strap connection portions for connecting a strap of the harness; and a connector body having a predetermined curvature and formed with a plurality of hook grooves to which a hook connected to the lead rope is caught.

5 Claims, 19 Drawing Sheets

CONNECTOR FOR PET LEAD ROPE

BACKGROUND OF THE INVENTION

1. Field of the Invention

The present invention relates to a connector for a pet lead rope, and more specifically, to a connector capable of helping to prevent patella dislocation by reducing a load such as a rotational force applied to hind legs of a pet due to an external force, which is caused by pulling the lead rope, when the pet wears a harness.

2. Description of the Related Art

When an owner goes out for a walk or exercise with a pet, the pet has to wear a tow rope such as a neck rope or chest rope. Such a tow rope is usually a neck rope worn on a pet's neck or is connected to a harness worn on a pet's body, and the owner moves with the pet while holding an end of the tow rope in his/her hand In particular, small dogs may have thin hind legs so that a patella may pop out without staying between bones according to movement of tendons, and many small dogs often have to undergo patellar dislocation surgery with the same symptoms on the hind legs.

This problem is caused due to a load applied to the legs of the pet by pulling the tow rope, and a method to fundamentally solve this problem is urgently required.

SUMMARY OF THE INVENTION

Every dog has its own intrinsic moment of inertia. The moment of inertia is determined based on the mass and length of an object, and the smaller the length and mass of the object, the smaller the intrinsic moment of inertia. Namely, smaller dogs have less ability to maintain their body from external forces (moment of inertia).

In contrast, when an external force of a person is applied to a neck rope of the dog due to the pulling of the person, the dog may suffer translation and rotation. Since the external force is generated away from the dog's center of gravity, a rotational force becomes stronger, resulting in the lifting of the forefeet wherein the hind feet serve as an axis of weight. In this case, a situation in which all loads have to be withstood by the dog's hind feet occurs every time, which may cause patella dislocation of the hind leg.

The present invention is to propose a connector capable of minimizing a load transmitted to a pet by changing a position between a lead rope and the connector according to a pulling direction so as to minimize the rotational force.

According to an embodiment, a connector for connecting a lead rope to a harness worn on a body of a pet includes: a pair of rectangular strap connection portions for connecting a strap of the harness; and a connector body having a predetermined curvature and formed with a plurality of hook grooves to which a hook connected to the lead rope is caught.

According to the connector of the present invention, a point where an external force of pulling the lead rope is applied to the pet is changed, so that the rotational force can be minimized, and accordingly, the load applied to the hind leg of the pet can be made constant, thereby helping to prevent of a patella of the hind leg of the dog.

DETAILED DESCRIPTION OF THE INVENTION

Figure 1:
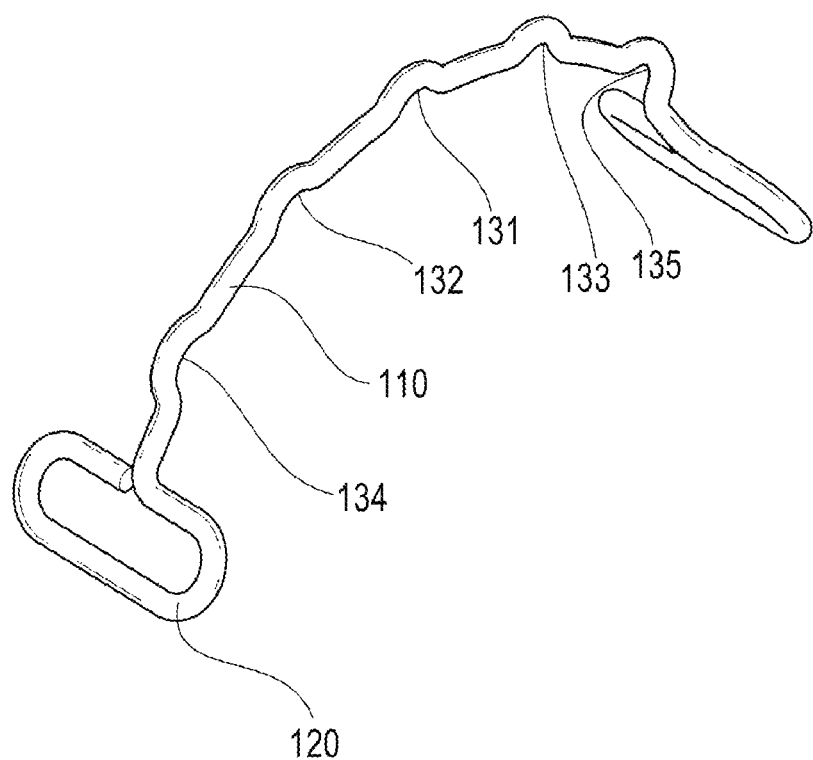
FIGS. 1 and 2 are views illustrating a connector according to a first embodiment of the present invention.
Figure 2:
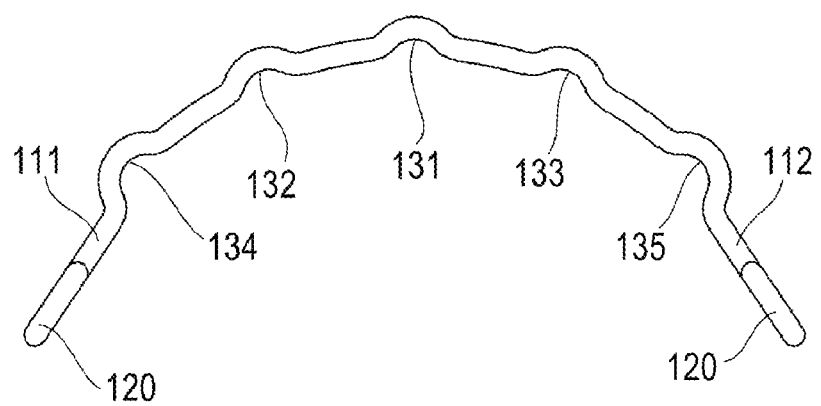
Figure 3:
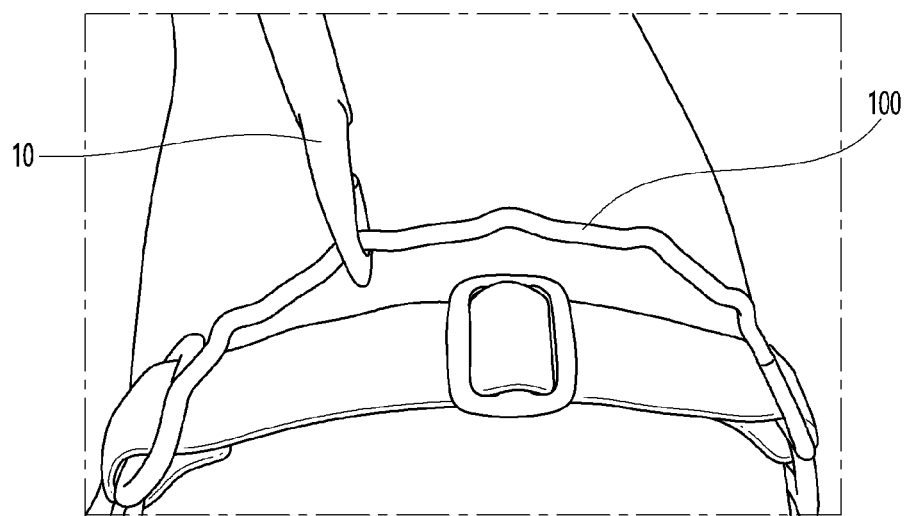
FIG. 3 is a view illustrating a state in which the connector is connected to a hook of a lead rope according to the first embodiment of the present invention.

FIGS. 1 and 2 are views illustrating a connector according to a first embodiment of the present invention, and FIG. 3 is a view illustrating a state in which the connector is connected to a hook of a lead rope according to the first embodiment of the present invention.

Referring to FIGS. 1 to 3, a connector 100 according to an embodiment includes a rectangular strap connection portion 120 connected to a harness worn on a body of a pet, and a connector body 110 having a predetermined curvature and formed between a pair of strap connection portions 120 with a plurality of grooves to which a hook 10 of the lead rope is caught.

The connector body 110 and the strap connection portion 120 may be formed as one member, but according to the embodiment, the strap connection portion 120 may be coupled or fixed to the connector body 110.

A strap of the harness coupled to the pair of strap connection portions 120 also has a cross section with a long rectangular shape, and the strap connection portion 120 is also formed in a rectangular shape. This is to reduce the extent to which the connector is rotated about the harness when the hook of the lead rope connected to the connector body 110 is pulled by a user, and to smoothly move the hook 10.

The connector body 110 has a plurality of hook grooves in which the lead rope hook 10 is seated while being caught, and the plurality of hook grooves include: a first hook groove 131 formed in the center of the connector body 110; second and third hook grooves 132 and 133 formed on both sides of the first hook groove 131 at predetermined intervals; a fourth hook groove 134 formed between the second hook groove 132 and one end of the strap connection portion 120; and a fifth hook groove 135 formed between the third hook groove 132 and the other end of the strap connection portion 120.

In the connector body 110, portions located at the strap connection portion 120, that is, portions of one end and the other end of the connector body may be referred to as body end portions 111 and 112, and a configuration of the body end portions may be an element capable of defining a shape and a size of the connector according to the embodiment. That is, the shape of the connector is made by drawing a virtual circle connecting the two body end portions 111 and 112 and using the center of the virtual circle as the center of gravity of the pet.

The fourth and fifth hook grooves 134 and 135 are formed at a portion located at an angle of about 45° from the center of gravity with respect to a horizontal line. That is, a position of a hook groove, which is formed closest to the strap connection portion 120 among the hook grooves, may be a portion located at an angle of about 45° from the center of gravity with respect to the horizontal line.

As illustrated in FIG. 3, the lead rope hook 10 is coupled to the connector, wherein the lead rope hook 10 is configured to naturally move to another hook groove so as to maintain the hooking according to an angle of the lead rope pulled by the user, that is, according to a force of pulling corresponding to the angle of the lead rope based on the center of gravity of a pet.

The shapes of the hook groove and the connector for implementing the technical idea according to the embodiments of the present invention will be described with reference to the angle of the lead rope pulled by the user and the pulling force.

Figure 4:
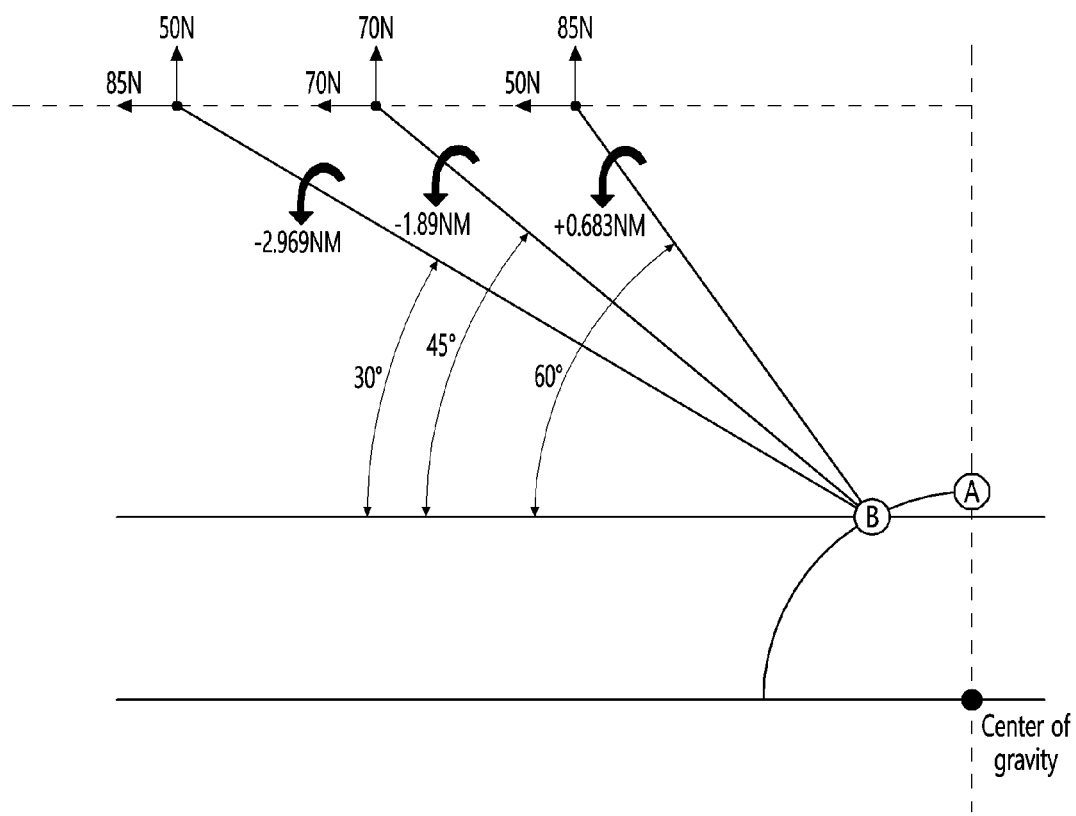
FIGS. 4 and 5 are views for explaining a load such as a rotational force applied to hind legs of a pet by an external force caused by pulling the lead rope.
Figure 5:
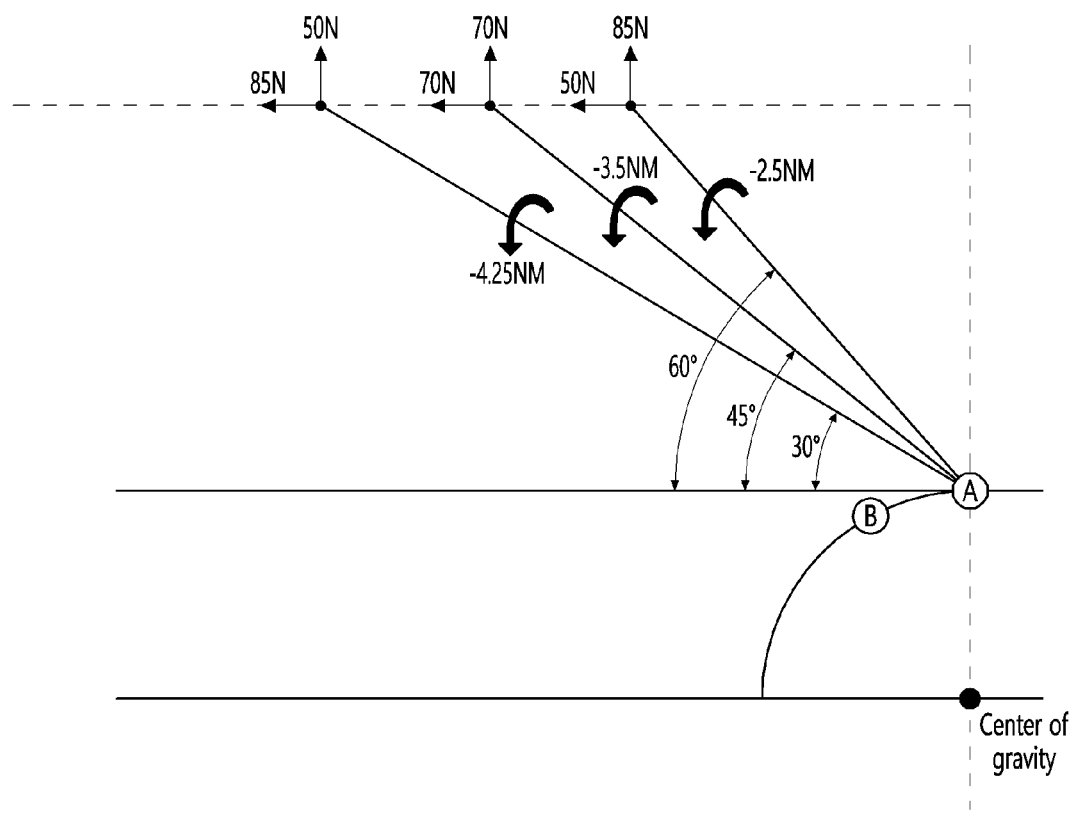

FIGS. 4 and 5 are views for explaining a load such as a rotational force applied to hind legs of a pet by an external force caused by pulling the lead rope.

It is assumed that a dog, which has a body diameter of 10 cm and the center of gravity at its center, is pulled to the left (toward a tail of the dog) in the drawings at angles of 30°, 45°, and 60° with a force of 100 N.

Since the existing harness has only point A where the harness is pulled, as illustrated in FIG. 5, when a force is calculated based on point A, the force of 100 N for the angles of 30°, 45°, and 60° is classified as a horizontal force and a vertical force, and when a rotational force therefor is calculated, the rotational force is −2.5 NM, −2.5 NM, and −4.25 NM according to the pulling at each position.

However, in this case, it is assumed that only the hook 10 moves in a state where the user and the dog stay still, the angle of 45° at point A is close to 60° at point B, and it can be seen that the rotational force is changed from −3.5 NM to +0.683 NM in a counterclockwise direction.

That is, when a person pulls the lead rope to the left (toward the tail), a rotational force that may be generated instantaneously is offset to move to the left by reducing the rotational force instantaneously applied to the left front leg and the left hind leg.

In consideration of the result value, the shape design of the connector is carried out. In addition, when an angle at point B is 30°, the rotational force (moment) increases, and thus the connector may be designed to move to the next adjacent hook.

Hereinafter, the shape of the connector body, the positions of the hook grooves, and the sizes of the grooves, which correspond to the concept of the present invention including the first embodiment, will be described in more detail.

For example, in a case of small dogs at a high risk of patella dislocation, when a circle connecting the body end portions 111 and 112 is drawn, a diameter of the circle may be 10.421 cm, and this is because when the diameter is about 10.5 cm (the circumference is about 33 cm), a body diameter of Maltese, one of the representative small dogs, is about 33 cm. Therefore, the size of the connector according to the present embodiment may be designed such that the diameter of the virtual circle is about 10.5 cm when the virtual circle connecting the body end portions of the connector is drawn.

Figure 6:
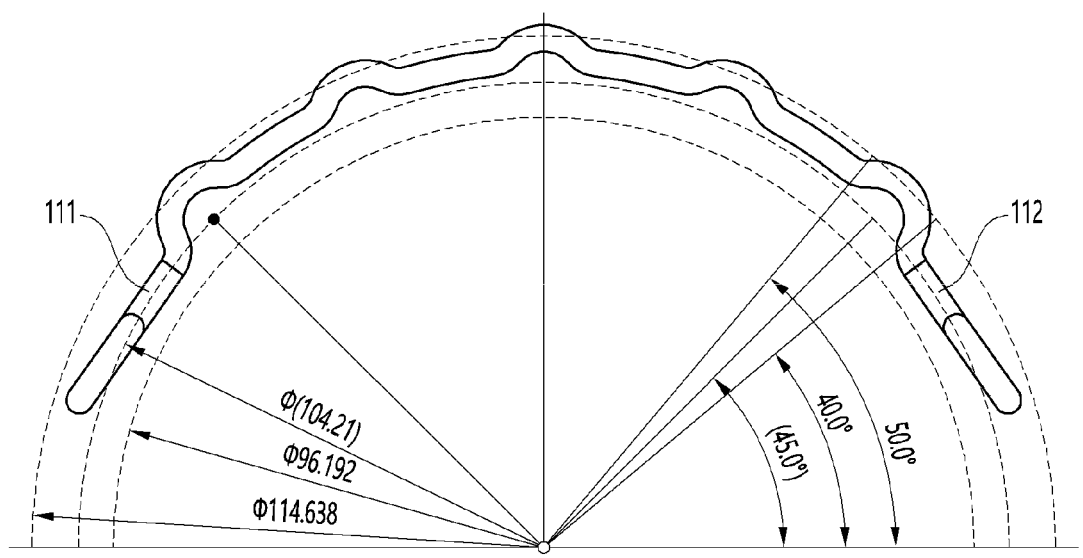
FIGS. 6 to 8 are views for explaining a connector according to an idea of the present invention, in which a virtual circle connecting body end portions, which are connected to a strap connection portion, is drawn.
Figure 7:
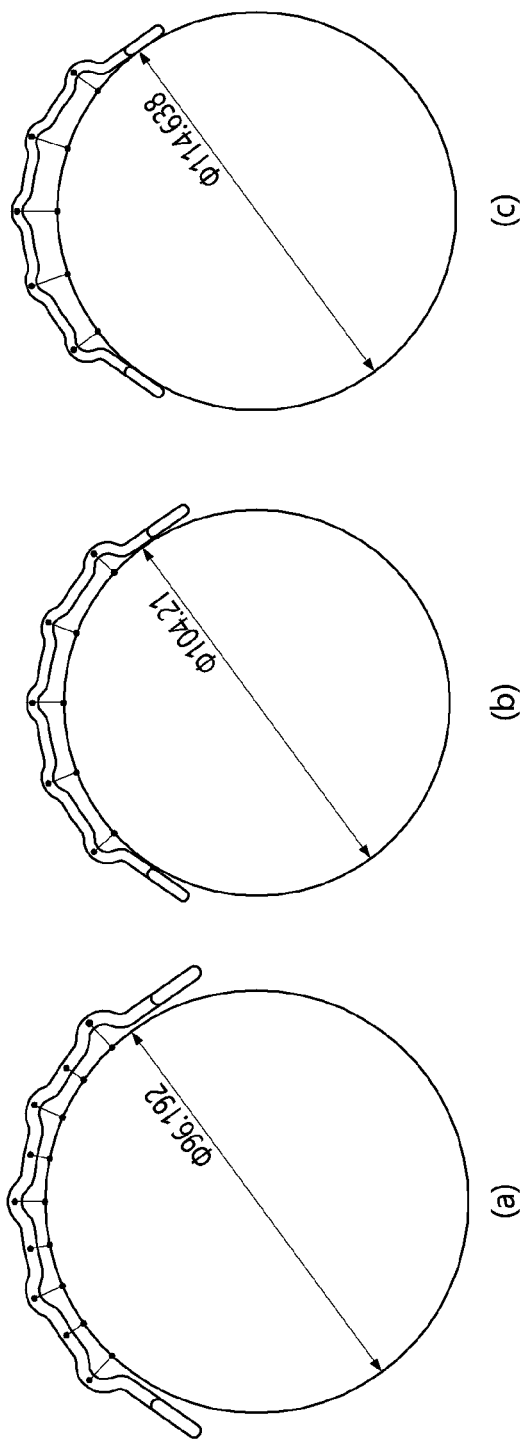
Figure 8:
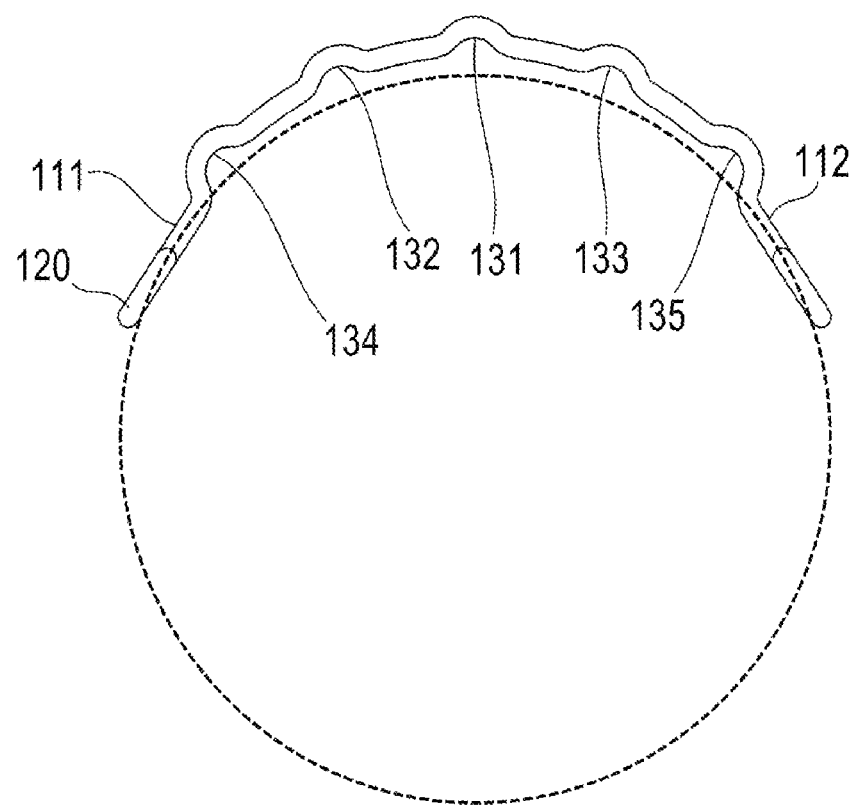

FIGS. 6 to 8 are views for explaining a connector according to an idea of the present invention, in which a virtual circle connecting body end portions, which are connected to a strap connection portion, is drawn.

When a circle connecting the centers of the body end portions 111 and 112 is drawn, a circle having a diameter of 10.421 cm (in the drawings, described as a diameter and a radius thereof is 5.02 cm) may be formed, and this is because the circle can mostly accommodate the size of 9.6192 cm to 11.463 cm corresponding to an average body diameter of the small dog.

FIG. 7 is a view for illustrating circles having a diameter of 9.61 cm (a), a diameter of 10.4 cm (b), and a diameter of 11.4 cm (c), in which a space where the lead rope hook may move in the connector of the first embodiment in order to check a size corresponding to a body size of small dogs.

FIG. 7 illustrates points and lines between the connector and the virtual circle to show a space for moving the lead rope hook, and when the circle connecting the centers of the body end portions 111 and 112 has a diameter of about 10.421 cm, it can be seen that both small dogs having a body diameter of about 9.61 cm and a body diameter of about 11.4 cm can secure the space for moving the lead rope hook.

That is, as illustrated in FIG. 8, when in the connector according to the embodiment, a circle connecting a first body end portion 111, which is formed between one side of the strap connection portion 120 and the fourth hook groove 134, and a second body end portion 112, which is formed between the other side of the strap connection portion 120 and the fifth hook groove 135, is drawn, the first to fifth hook grooves 131 to 135 are formed at a position spaced apart from the circle by predetermined distances.

Through the configuration, a lead rope hook coupled to any one of the hook grooves may smoothly move to another hook groove, and the strap connection portion 120 and the body end portions 111 and 112 may come into close contact with the body of the pet.

Next, a configuration in which the hook groove and a portion adjacent to the hook groove are rounded that according to the embodiment will be described.

Each of the hook grooves is formed to easily move the hook to a position where a low load is applied to the pet due to the direction and force of pulling the lead rope by the user while catching the lead rope hook, the seating and catching of the hook is maintained by the depth of the hook groove, and when the hook moves, the movement is smoothly performed by rounded portions on both sides of the hook groove.

Figure 9:
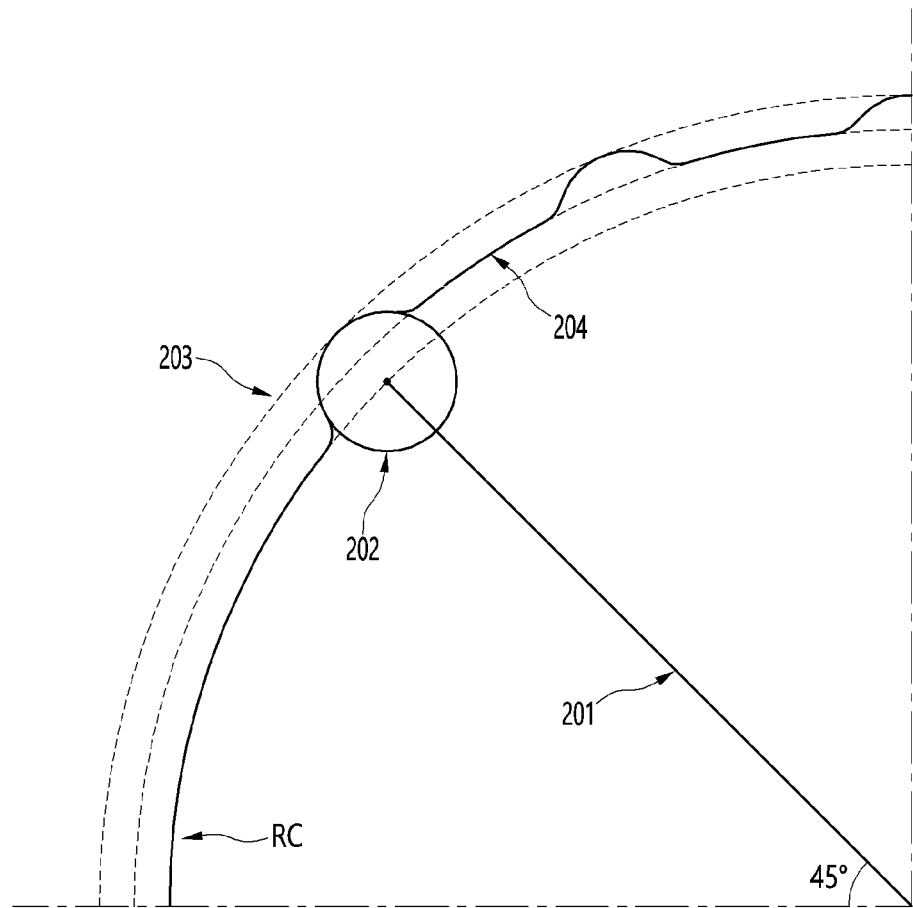
FIGS. 9 to 11 are views for explaining a hook groove of the present embodiment.
Figure 10:
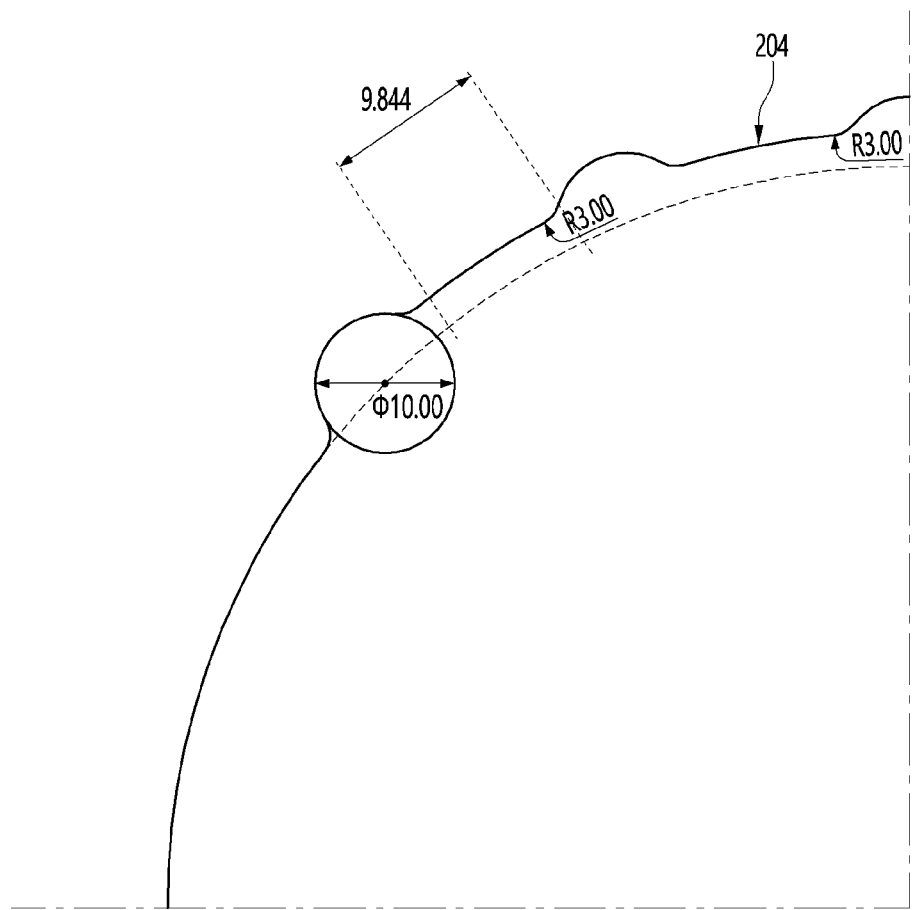
Figure 11:
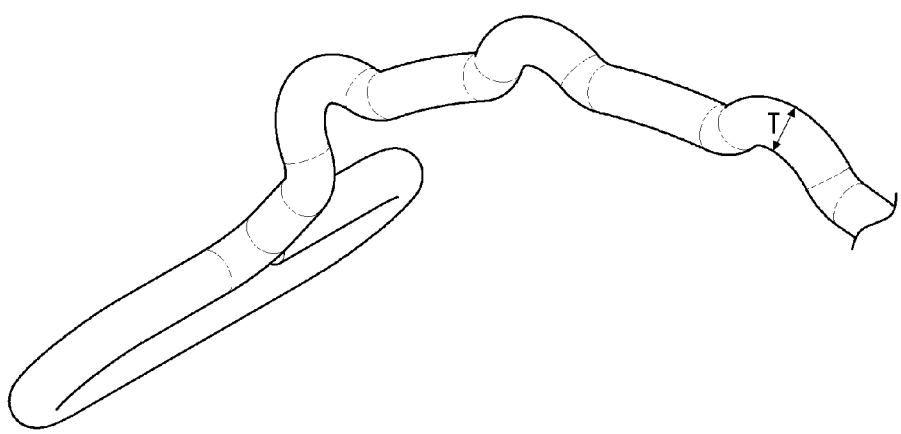

FIGS. 9 to 11 are views for explaining a hook groove of the present embodiment.

According to the embodiment, when a virtual circle (hereinafter, a reference circle) passing through the centers of both body end portions 111 and 112 is drawn, and a horizontal line (transverse line) passing through the center of a corresponding reference circle RC is drawn to form a semicircle, if a line 201 having an angle of 45° with respect to the horizontal line is drawn, a position (reference point) in contact with the reference circle RC may be a position where the hook groove is formed.

In addition, an auxiliary circle 202 having a diameter of about 1 cm may be drawn around the reference point, an outer circle 203 having the same center as the reference circle RC and a diameter greater than a diameter of the reference circle RC may be drawn to make contact with the auxiliary circle 202, and an intermediate circle 204 may be drawn between the reference circle RC and the outer circle 203. In this case, the intermediate circle 204 may be a reference for determining the shape and thickness of the hook groove to be rounded when the hook groove is formed.

That is, when a diameter of the reference circle RC is 10.421 cm and a diameter of the outer circle 203 is 11.421 cm, the diameter of the intermediate circle 204 is 10.921 cm, and the degree in which the auxiliary circle 202 and the intermediate circle 204 are rounded while being connected may be determined. In addition, when thickness T of the connector according to the embodiment is set to about 3 mm, smooth curvature is formed when a rounded shape of the auxiliary circle 202 having a diameter of 1 cm and the intermediate circle 204 is set to about R=3.

The shape of the connector may be specified through such a process, and the lead rope hook fixed to the hook groove may smoothly move due to the rounded shape when the lead rope hook moves to the adjacent another hook groove by the user.

The size of the hook grooves constituting the connector according to the embodiment and intervals between the hook grooves will be described in more detail.

Figure 12:
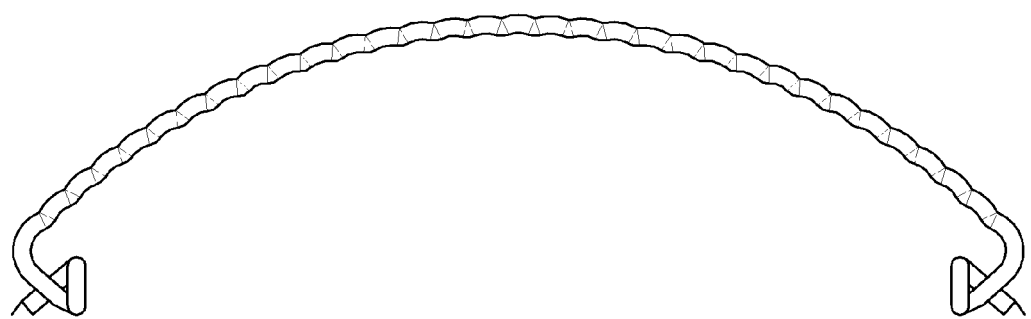
FIG. 12 is a reference view illustrating a case where hook grooves to which a lead rope hook is caught while being seated are excessively formed.

FIG. 12 is a reference view illustrating a case where hook grooves to which a lead rope hook is caught while being seated are excessively formed.

FIG. 12 illustrates an example in which the lead rope may be formed by stacking circles having a diameter of 1 cm so as to dispose as many circles as possible, and in this case, when the user pulls the lead rope, a force of maintaining the hook at a specific hook groove is very small, and thus the hook is separated even if the angle is slightly changed. That is, the lead rope hook is sensitive to the change in angle and has a week fixing force, so that the hook moves even with the small pulling force, resulting in loss of control.

Figure 13:
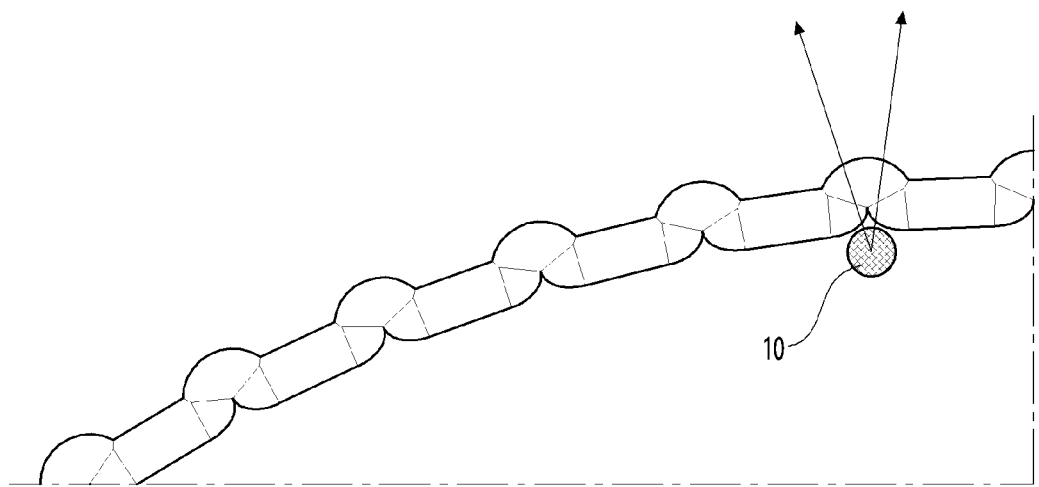
FIG. 13 is a reference view illustrating a case where a size of the hook groove to which the lead rope hook is fixed is excessively small.

FIG. 13 is a reference view illustrating a case where a size of the hook groove to which the lead rope hook is fixed is excessively small.

As illustrated in FIG. 13, when the shape of the hook groove is very small, the lead rope hook 10 is not seated in or caught to the catching groove, and thus it is impossible to control the lead rope.

Therefore, it can be seen that the size of the hook groove or the depth of the hook groove has to be designed in consideration of the thickness of the lead rope hook.

Figure 14:
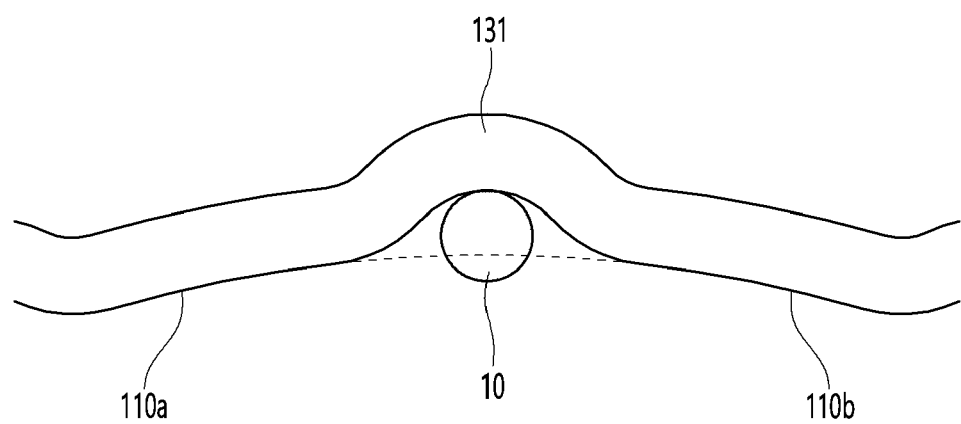
FIGS. 14 to 16 are views for explaining a size of the hook groove of the connector according to an embodiment of the present invention.
Figure 15:
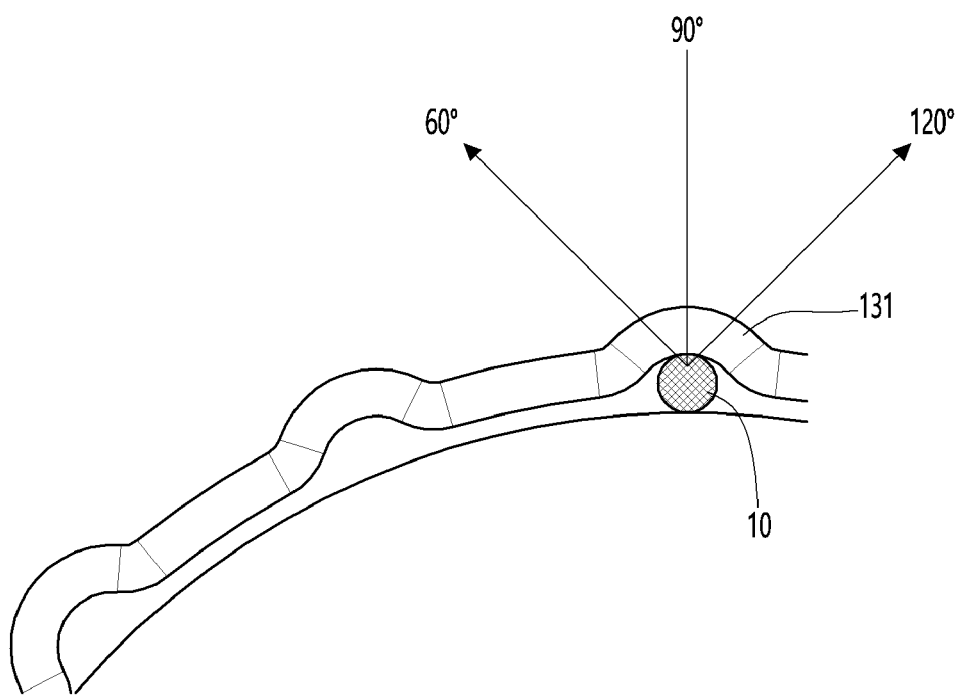
Figure 16:
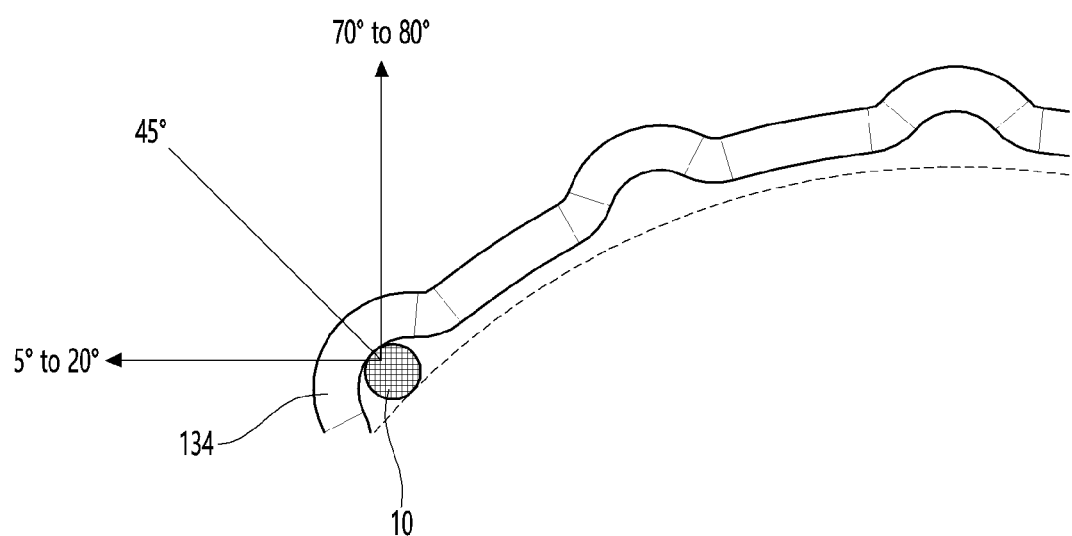

FIGS. 14 to 16 are views for explaining a size of a hook groove of the connector according to an embodiment of the present invention.

First, in the connector according to the embodiment, it is preferable that the hook groove is formed to have a depth such that the lead rope hook is seated in the groove by at least ½ of the thickness of the lead rope hook. That is, as illustrated in FIG. 14, the depth of the groove may be defined based on a line connecting inner peripheral surfaces 110a and 110b of the connector body, which are located at both sides of the hook groove 131, and when the hook 10 is seated in the hook groove, the hook groove is formed such that the center of the thickness of the hook 10 is located at a position higher than a position of the line connecting the inner peripheral surfaces of the connector body.

In addition, as illustrated in FIG. 15, when it is assumed that the hook 10 is caught to a point located vertically upward corresponding to an angle of 90° in the reference circle RC, the hook 10 may be designed to be separated from the hook groove when the lead rope is pulled out of an angle within a range of −30° to +30° based on the vertical line (described as 90°).

In addition, as illustrated in FIG. 16, the hook groove, which is located at a position corresponding to 45° from the center of the reference circle RC, may be designed such that it goes to an end stop point as the angle is decreased to 5° to 20°. That is, when the angle of the lead rope is formed to almost lie on the floor, the moment at the 45° groove (the fourth hook groove 134) also increases. In this case, it goes to the end stop point to offset the moment as much as possible. When the angle exceeds 70° to 80° from 45°, an absolute value of the moment increases even at 70° to 80° in a moment calculation equation, and thus it is preferable that gear shifting (movement of the hook groove) is performed.

FIGS. 17 to 20 are views for explaining a rectangular lead rope connection portion and a load of a pet, which is caused by a backward pulling force, according to the present embodiment.

According to the embodiment, in embodiments including the second and third embodiment, which will be described later, the rectangular strap connection portion is provided, and accordingly, as the connector according to the present invention, a connector having a flat strap connected to the harness worn by the pet is used.

Figure 17:
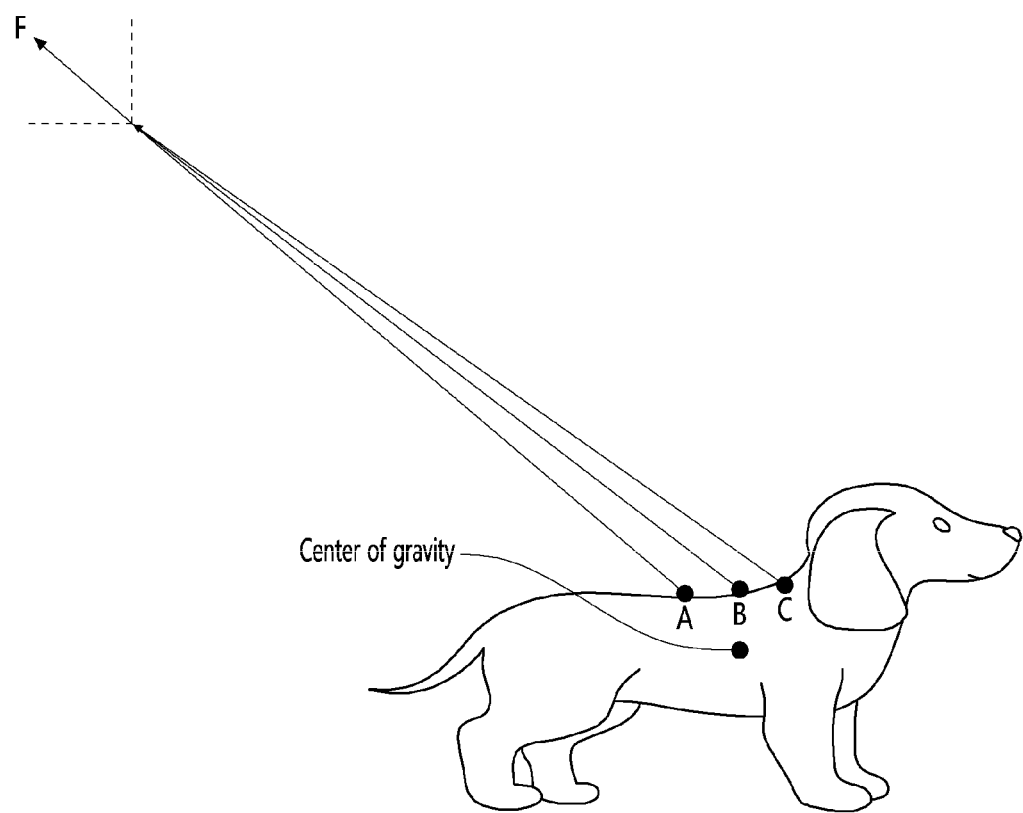
FIGS. 17 to 20 are views for explaining a rectangular lead rope connection portion and a load of a pet, which is caused by a backward pulling force, according to the present embodiment.
Figure 18:
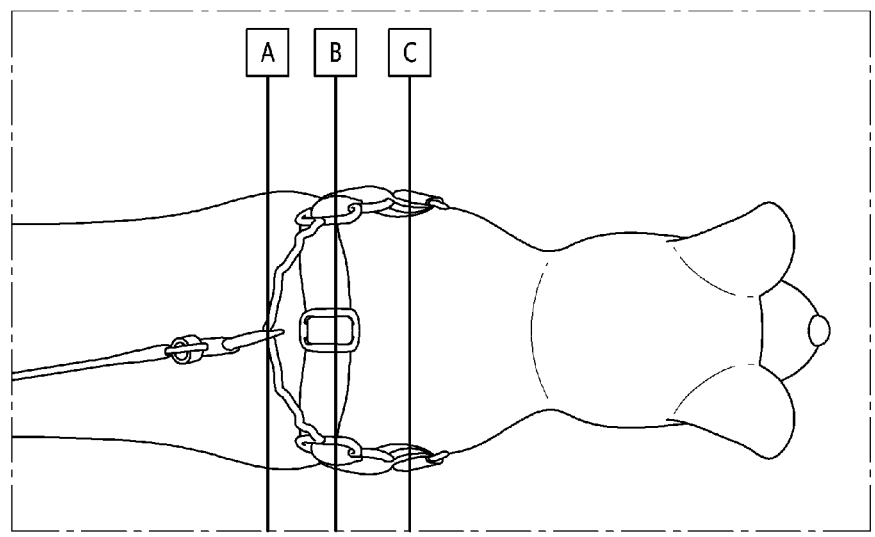

As illustrated in FIGS. 17 and 18, when the pet is pulled backward and forward, a force of rotating enough to lifting the forefoot of the pet may be generated according to the center of gravity, and in general, a harness hook may be mostly present at point C, so that when the pet is pulled with a predetermined force F while being fixed to point C, a force of rotating in the counterclockwise direction is transmitted to the pet.

In this case, a load is concentrated on the hind foot, and when the load is out of a moment threshold value, the forefoot is lifted and all the loads are applied to the hind foot. To offset the force, point A located rearward from the center of gravity will be advantageous. However, when the pet is pulled forward rather than backward, the load applied at point A is the highest, and thus it is necessary to have a configuration in which it is located at point B in normal time, and rotatable between point A and point C.

To this end, according to the embodiments of the present invention, a rectangular strap connection portion to which a harness connection portion such as a flat cloth is inserted and fixed is provided. In addition, it is necessary for the harness, which is coupled to the connector, to be also connected to the flat cloth such that a damper function may be realized to some extent when the pet is pulled forward and backward.

Figure 19:
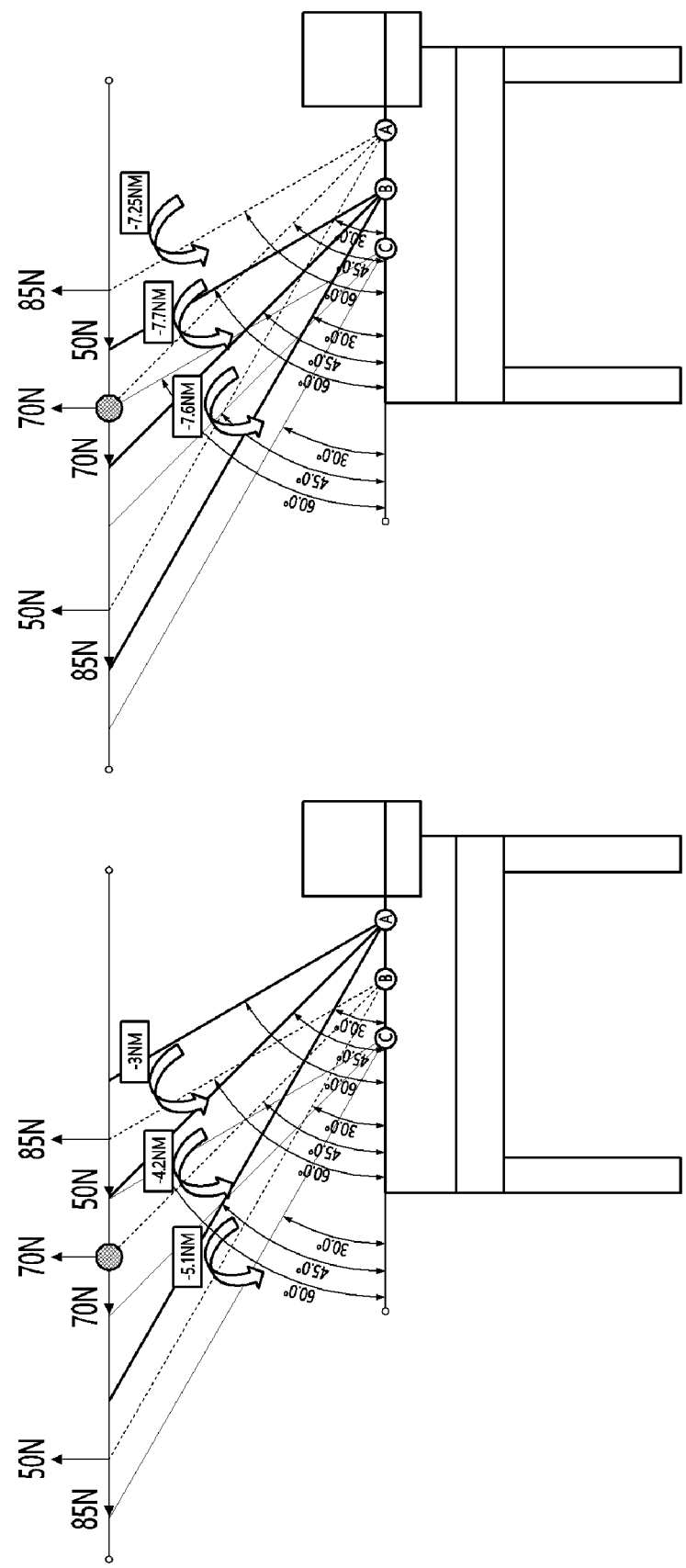
Figure 20:
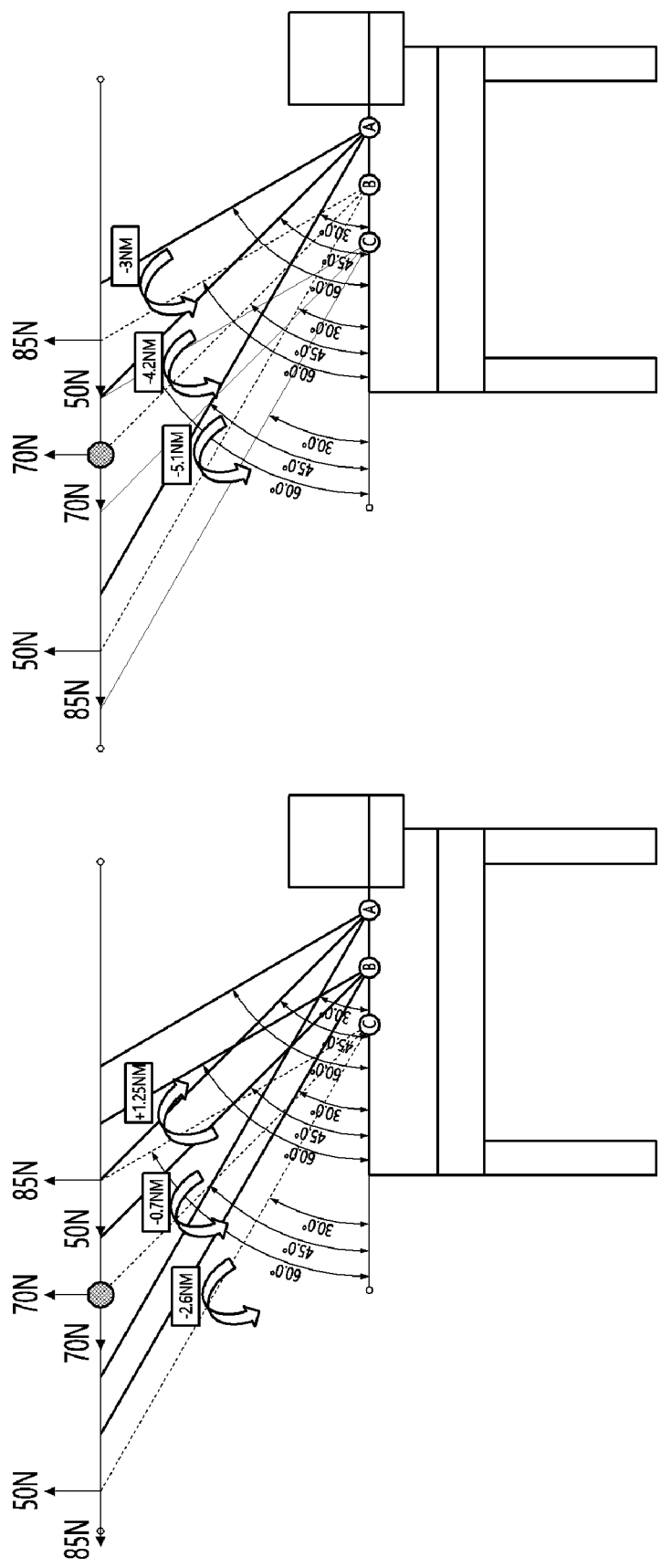

Referring to FIGS. 19 and 20, a calculation equation is exemplarily calculated based on a Pomeranian dog breed that is one of companion animals. It is assumed that a dog has a body diameter of 10 cm, a body length of 30 cm, a head length of 15 cm, and a head length of 10 cm.

The center of gravity is roughly assumed based on a width that is at a point of 18 cm from an end of the body (6:4=18 cm:12 cm) in consideration of a weight of a head and a height that is 4 cm upward from a bottom of the body in consideration of the leg. In addition, the center of gravity is two-dimensionally represented for convenience of calculation, and it is assumed that point B is directly above the center of gravity, and it is assumed that points A and C are 5 cm apart from point B (above the center of gravity). In order to understand the present invention, first, an observation is carried out when the positions are different based on the existing harness.

The hook position of the existing harness is usually point A as illustrated in FIG. 24. When the force for an angle of 30° to 60° is classified as a horizontal force and a vertical force, and a rotational force therefor is determined as follows on the right side of FIG. 23.

When the rotational force is calculated, it can be seen that a large rotational force is generated in the counterclockwise direction. Due to the rotational force, the forefeet of the dog are lifted wherein the hind legs serve as an axis of weight by a greater rotational force compared to the rotational inertia moment, thereby rotating in the counterclockwise direction.

Then, when the pet is pulled at position B (above the center of gravity), it can be seen that point B also receives a slightly greater rotational force although the point B receives a less rotational force than point A.

To offset this rotational force, point C is preferable because a pulling point has to go back more than the center of gravity, and point C may be offset by the front and rear moments, so that the forefoot of the dog may not be lifted, but it is not very good when moving left and right. This is because, when moving left and right at point C, a hip rotates left and right by the rotational force. Therefore, it is necessary to devise a method for offsetting the moment as much as possible, such as setting the pulling point as point B in normal times, and changing the pulling point to point C if necessary.

To offset the moment at point B itself, the pulled position is lowered toward the center of gravity (downward from B), and only moves toward C when pulled back. For that purpose, it is necessary to design a structure in which the hook and the strap rotate together.

Figure 21:
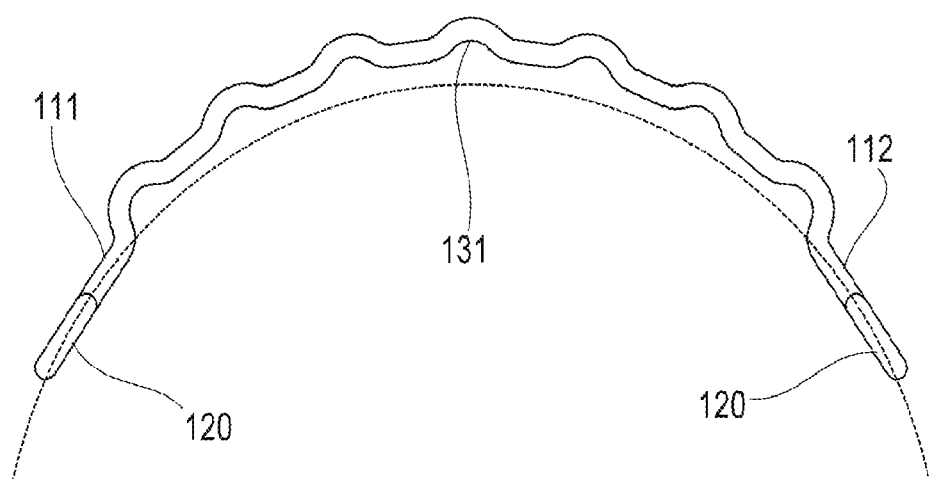
FIGS. 21 and 22 are views illustrating connectors according to a second embodiment and a third embodiment, which are other embodiments of the present invention.
Figure 22:
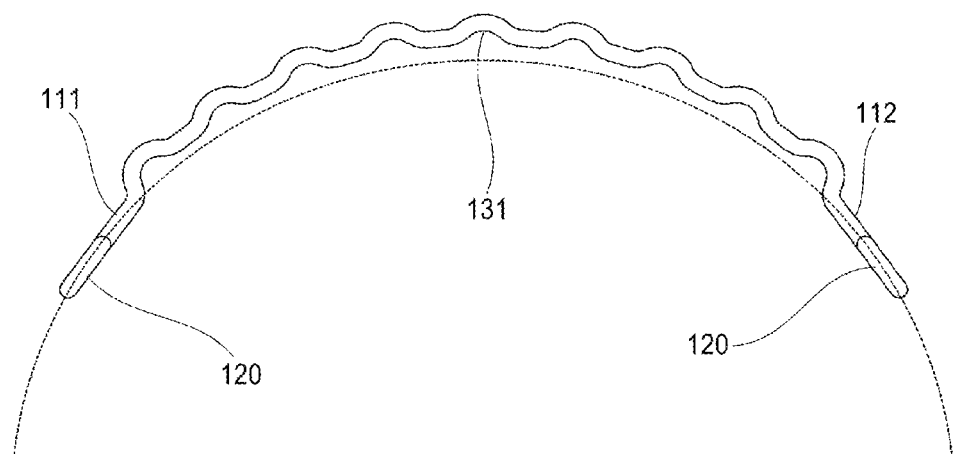

FIGS. 21 and 22 are views illustrating connectors according to a second embodiment and a third embodiment, which are other embodiments of the present invention.

In a case of the embodiments illustrated in FIGS. 21 and 22, as in the first embodiment, when a circle connecting the body end portions 111 and 112 disposed between the strap connection portion 120 and the connector body 110 is drawn, all of the plurality of hook grooves are formed to be located outside the circle.

In addition, in the connector of the second embodiment, three hook grooves are formed on each of both sides of the first hook groove 131, which is located vertically upward from the center of the circle, at predetermined intervals, and in the connector of the third embodiment, four hook grooves are formed on each of both sides of the first hook groove 131, which is located vertically upward from the center of the circle, at predetermined intervals.

Although not illustrated, when a connector has a shape in which a circle for connecting the body end portions is drawn, and a plurality of hook grooves are located outside the circle, those skilled in the art may variously design and modify the number of hook grooves and the length of the connector.

What is claimed is:

1. A connector for connecting a lead rope to a harness worn on a body of a pet, the connector comprising:
   a pair of rectangular strap connection portions for connecting a strap of the harness; and
   a connector body having a predetermined curvature and formed with a plurality of hook grooves to which a hook connected to the lead rope is caught.

2. The connector of claim 1, wherein the connector body includes a pair of body end portions connected to the strap connection portion.

3. The connector of claim 2, wherein when a virtual circle connecting the body end portions is drawn, the hook grooves are located outside the circle.

4. The connector of claim 3, wherein the hook grooves include a first hook groove located vertically above a center of the circle, and at least one or more hook grooves formed on both sides of the first hook groove at equal intervals.

5. The connector of claim 3, wherein a depth of each hook groove is defined using a line connecting inner peripheral surfaces of the connector body located at both sides of each hook groove, and a thickness of the hook of the lead rope, and
   the depth of each hook groove is formed such that a center of the thickness of the hook is located at a position higher than a position of the line connecting the inner peripheral surfaces when the hook of the lead rope is seated in one of the hook grooves.

* * * * *